United States Patent [19]

Dottori

[11] 4,269,447
[45] May 26, 1981

[54] DEVICE FOR THE REGULATION OF THE POSITION ON THE BACK OF RECLINING SEATS

[75] Inventor: Roberto B. Dottori, Buenos Aires, Argentina

[73] Assignee: Grinfa Sociedad de Responsabilidad Limitada, Capital Federal, Argentina

[21] Appl. No.: 741,581

[22] Filed: Nov. 12, 1976

[30] Foreign Application Priority Data

Nov. 13, 1976 [AR] Argentina ............................. 261174

[51] Int. Cl.³ .............................................. A47C 3/22
[52] U.S. Cl. ..................................... 297/365; 297/367
[58] Field of Search ............... 297/365, 366, 367, 363, 297/379; 248/394

[56] References Cited

U.S. PATENT DOCUMENTS

| 2,018,828 | 10/1935 | Bell | 297/365 X |
| 3,309,139 | 3/1967 | Turner et al. | 297/367 |
| 3,737,946 | 6/1973 | Giuliani | 297/367 |
| 3,829,156 | 8/1974 | Iida et al. | 297/379 |
| 3,870,269 | 3/1975 | Werner et al. | 248/394 |
| 3,879,802 | 4/1975 | Werner | 297/367 |

FOREIGN PATENT DOCUMENTS

| 2006270 | 9/1971 | Fed. Rep. of Germany | 297/366 |
| 149986 | 5/1955 | Sweden | 297/366 |

Primary Examiner—Francis K. Zugel

[57] ABSTRACT

A mechanism for adjusting the position of the back of a reclining seat comprises a sector of circular toothed interior configuration joined to a movable member attached to the seat back. The seat back member is rotatably joined to a member fixed to the seat. A restraining member is slidably mounted on said fixed member with a toothed outer edge to engage said toothed interior configuration on the movable back. The restraining member is moved by means of a lever toward and away from a connect and disconnect position to allow movement and fixation of the seat back.

6 Claims, 3 Drawing Figures

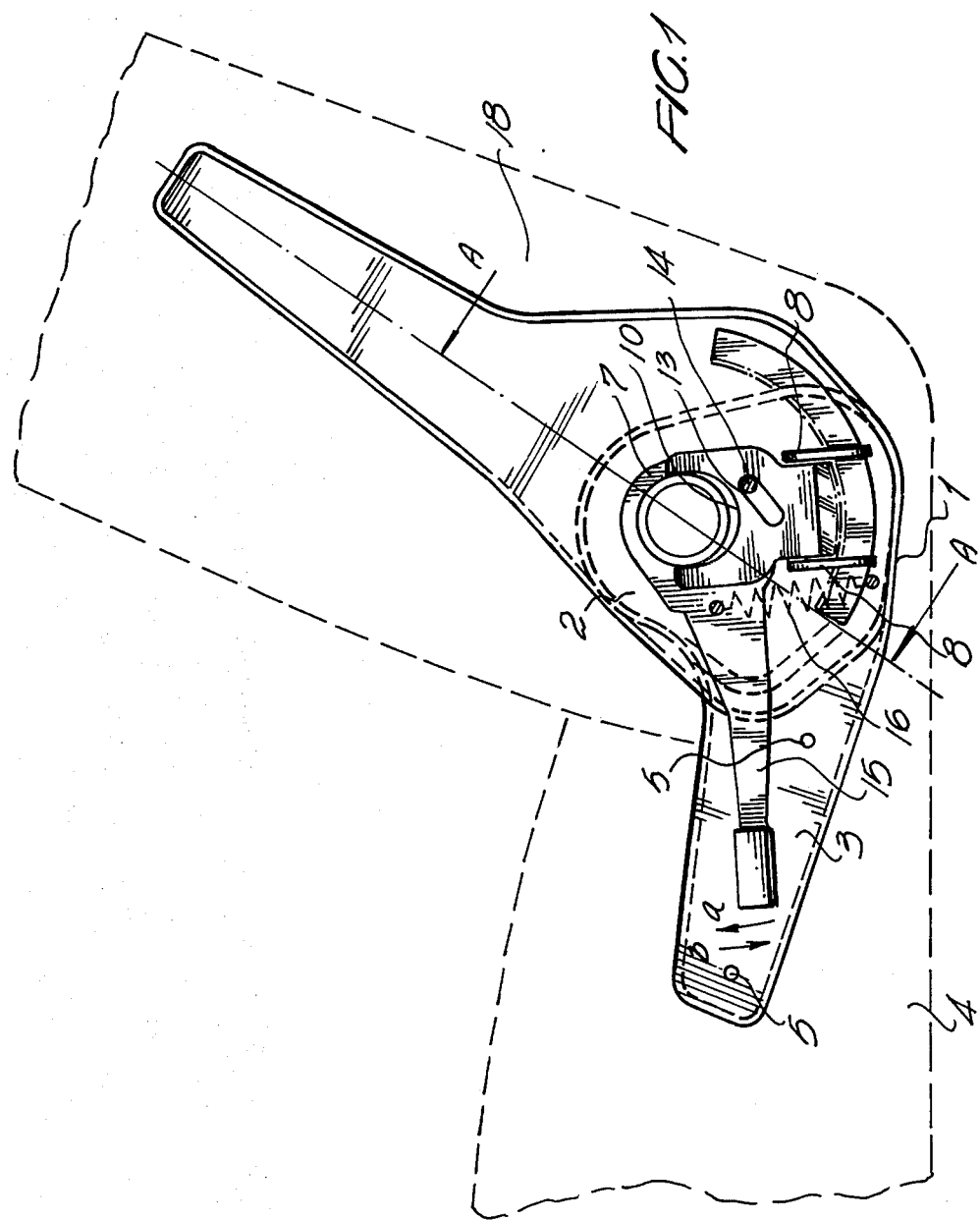

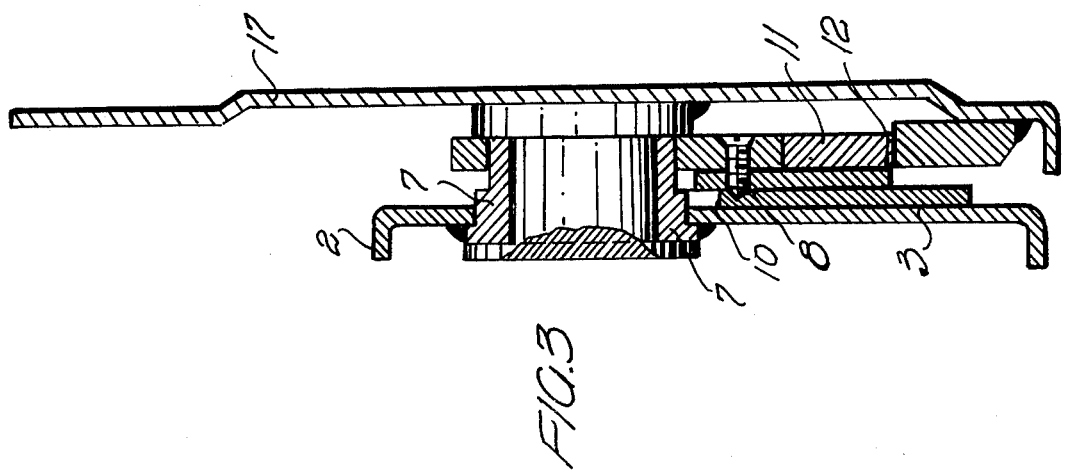
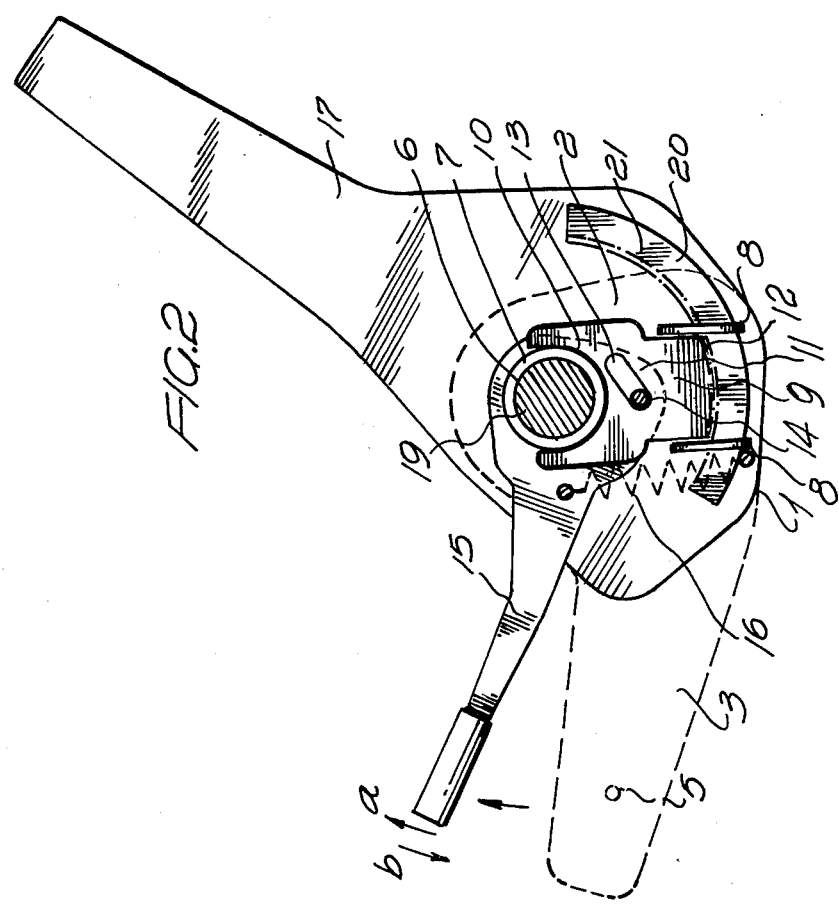

DEVICE FOR THE REGULATION OF THE POSITION ON THE BACK OF RECLINING SEATS

The present invention relates to a novel arrangement for adjusting the position of the backs of reclining seats, and has as its principal object the provision of a means for selecting and adjusting the seat position combining the largest possible choice of positions with simple and secure adjustment.

At the present time, the use of seats with reclining backs has become very widespread. Large numbers of such seats are used in land, sea and airborne vehicles, offering great comfort to passengers and permitting them to select the reclining position most comfortable for them.

Despite their widespread use, however, the adjustment means presently employed offer a choice of only four or five reclining positions, and this is often insufficient to obtain the optimum reclining position desired.

The structural and operational characteristics of the adjusting means which is the object of the present invention make it possible to choose between a considerable number of positions, to an extent that the difference between two adjacent positions is practically imperceptible.

The said mechanism consists essentially of a sector of circular toothed configurations internally joined to a movable member attached to the seat back, said member's being rotatably joined to a member fixedly attached to the seat back, the latter being provided with a slidable toothed sector adapted to be actuated by means of a lever which moves it toward or away from the sector attached to the seat back, respectively connecting or disconnecting the seat to allow its movement and fixation in the desired position.

As the selected seat back position results from the engagement of the two toothed portions, it will be clear that each relative displacement of a tooth between the two portions corresponds to a new seat back position, which implies the possibility of a large number of positions.

On the other hand, when the seat back is locked by engagement of the two toothed portions, the load transmitted thereby to the regulating arrangement distributes itself over a larger area, which no doubt reduces wear, compared to arrangements presently in use, whose premature wear causes extremely annoying clatter.

In order that the invention may be clearly understood and easily put into practice, a preferred embodiment has been shown in the accompanying drawings, wherein:

FIG. 1 is a schematic side elevation of the apparatus according to the invention in locked position.

FIG. 2 is a schematic side elevation of the apparatus in unlocked position.

FIG. 3 shows a section view of the apparatus along line A—A of FIG. 1.

In the above-mentioned drawings, the same reference numerals indicate the same or corresponding parts of the invention, comprising a fixed member 1 having a body 2 and an extension 3 in one direction, the fixed member being fastened to the seat 4 by screws 5. Fixed member 1 has an orifice 6 in the central portion of its body, a bushing 7 projecting from body 2 concentrically with said orifice. At its lower portion, body 2 has a pair of parallel prismatic projections 8, forming a pair of guides. Slidably supported on body 2 is a restraining member 9 whose upper portion has a U-shaped notch 10 which receives bushing 7, while its lower portion slides between guides 8 and its central portion has a ridge with a toothed arc-shaped circumferential outer edge 12. Adjacent to the inner edge of notch 10, restraining member 9 has a diagonal slot 13 receiving pin 14 integral with actuating lever 15 rotatably mounted on the exterior of bushing 7, actuating lever 15 being biased toward the lower edge of member 1 by action of spring 16 attached at one of its ends to lever 15 and at the other of its ends to fixed member 1.

Integral with lever 15 is cam 11, whose supporting face slides on the ridge of restraining member 9.

Movable member 17 is secured to seat back 18 and is rotatably connected to fixed member 1 by means of its axle 19 mounted in bushing 7 of the fixed member. Movable member 17 has an integral, internally toothed circular sector 20 whose opening orifice corresponds to the desired angle of movement of the seat back, the toothed portion being lined up with the toothed portion of restraining member 9.

The operation of the apparatus is as follows:

When actuating lever 15 is in locked position (FIG. 1), toothed portion 12 of restraining member 9 meshes with toothed portion 21 of circular sector 20, thereby preventing movement of movable member 17 and consequently that of seat back 18. Upon displacement of actuating lever 15 in direction a, pin 14 integral therewith moves with respect to the axle of lever 15, in contact with the edge of diagonal slot 13, causing longitudinal displacement of restraining member 9 to cause separation of toothed portion 12 from toothed member 21, thereby freeing movable member 17 and consequently seat back 18 (FIG. 2). The latter can then be moved to its desired fixed position, while releasing actuating lever 15 which, under the influence of spring 16, moves in direction b, whereupon cam 11 forces restraining member 9 to move until toothed portion 12 meshes with toothed portion 21 of circular sector 20.

What is claimed:

1. Apparatus for adjusting the back of a reclining seat, comprising:
   (a) a fixed member attached to said seat;
   (b) a movable member mounted on the reclining back of said seat;
   (c) a cylindrical bushing integral with and projecting concentrically from an orifice in the central portion of said fixed member;
   (d) an axle mounted in said cylindrical bushing for rotatably connecting said movable member to said fixed member;
   (e) a pair of substantially parallel projections on the lower portion of said fixed member;
   (f) a restraining member slidably arranged on said fixed member between said projections and having a notch in its upper portion for receiving said cylindrical bushing;
   (g) the lower portion of said restraining member being formed as a ridge with a toothed outer edge;
   (h) a circular sector fixedly attached adjacent the lower edge of said movable member, said circular sector having a toothed interior edge facing said toothed outer edge of said restraining member for selective engagement therewith;
   (i) an actuating lever rotatably mounted coaxially with said movable member on the end of said cylindrical bushing for upward and downward movement into unlocked and locked positions, respectively;

(j) a diagonal slot in the central portion of said restraining member; and (k) a pin integral with said actuating lever and slidably received in said diagonal slot;

(l) whereby movement of said actuating lever causes longitudinal displacement of said restraining member to effect disengagement of said toothed portions.

2. Apparatus according to claim 1, wherein said actuating lever is mounted for movement in a plane between said fixed and movable members.

3. Apparatus according to claim 1, wherein adjustment of the back of said reclining seat is not simultaneous with disengagement of said toothed portions of said fixed and movable members.

4. Apparatus according to claim 3, wherein said notch in the upper portion of said restraining member is substantially U-shaped.

5. Apparatus according to claim 1, including means for biasing said actuating lever downwardly into locking position.

6. Apparatus according to claim 5, wherein said biasing means comprises a tension spring attached by one of its ends to said actuating lever and by the other of its ends to said fixed member.

* * * * *